(12) United States Patent
Rutgers et al.

(10) Patent No.: US 9,363,856 B2
(45) Date of Patent: Jun. 7, 2016

(54) DRIVER DEVICE AND DRIVING METHOD FOR DRIVING A LOAD, IN PARTICULAR AN LED UNIT

(71) Applicant: KONINKLIJKE PHILIPS N.V., Eindhoven (NL)

(72) Inventors: Andrew Ulrich Rutgers, Eindhoven (NL); Reinhold Elferich, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/433,059

(22) PCT Filed: Oct. 16, 2013

(86) PCT No.: PCT/IB2013/059390
§ 371 (c)(1),
(2) Date: Apr. 2, 2015

(87) PCT Pub. No.: WO2014/064578
PCT Pub. Date: May 1, 2014

(65) Prior Publication Data
US 2015/0245431 A1    Aug. 27, 2015

Related U.S. Application Data

(60) Provisional application No. 61/718,255, filed on Oct. 25, 2012.

(51) Int. Cl.
H05B 41/16    (2006.01)
H05B 33/08    (2006.01)
(52) U.S. Cl.
CPC ........ *H05B 33/0815* (2013.01); *H05B 33/0818* (2013.01); *Y02B 20/346* (2013.01)

(58) Field of Classification Search
USPC .............. 363/16, 17, 132; 315/224, 225, 226, 315/276, 291, 307, 308
See application file for complete search history.

(56) References Cited

U.S. PATENT DOCUMENTS 5,053,937 A * 10/1991 Blockl ................ H02M 3/3376
363/16
7,313,004 B1    12/2007 Yang et al.
(Continued)

FOREIGN PATENT DOCUMENTS

| JP | 2002315331 A | 10/2002 |
|---|---|---|
| JP | 2005033534 A | 2/2005 |

(Continued)

*Primary Examiner* — Thuy Vinh Tran (57) ABSTRACT

The present invention relates to a driver device (10) for driving a load (18), in particular an LED (18) unit having one or more LEDs, comprising input terminals (14, 16) for connecting the driver device (10) to a voltage supply (12) and for receiving an input voltage (V10) from the voltage supply (12), an output terminal for connecting the driver device (10) to the load (18), an converter unit (24) for converting a drive voltage to an output (V20) voltage for powering the load (18), a switching unit (20, 22) connected to the input terminals (14, 16) for providing different voltage levels as the drive voltage to the converter unit (24), and a control unit (28) for controlling the switching unit (20, 22) on the basis of an electrical converter signal (V12; V13; I12; I13) measured at a member (30, 36) of the converter unit (24) and a reference signal (Vth) having an alternating component to provide an out put signal (V20) having an alternating signal component on the basis of the alternating component of the reference signal (Vth).

20 Claims, 7 Drawing Sheets

(56) References Cited

U.S. PATENT DOCUMENTS

| | | | |
|---|---|---|---|
| 8,203,855 B2* | 6/2012 | Shimada | H01F 27/38 363/16 |
| 8,711,579 B2* | 4/2014 | Takaki | H02M 1/32 363/21.01 |
| 9,019,725 B2* | 4/2015 | Cantoro | H02M 3/3387 363/21.02 |
| 2002/0080628 A1 | 6/2002 | L'Hermite | |
| 2009/0322249 A1 | 12/2009 | Weger | |
| 2010/0013649 A1 | 1/2010 | Spira | |
| 2010/0202175 A1 | 8/2010 | Balakrishnan et al. | |
| 2010/0277961 A1 | 11/2010 | Moyer et al. | |
| 2011/0164437 A1* | 7/2011 | Sun | H02M 3/33569 363/16 |
| 2011/0266964 A1 | 11/2011 | Schlenk et al. | |

FOREIGN PATENT DOCUMENTS

| | | |
|---|---|---|
| JP | 2006352935 A | 12/2006 |
| JP | 2007068395 A | 3/2007 |
| JP | 2009224244 A | 10/2009 |
| JP | 2011030331 A | 2/2011 |
| JP | 2011083049 A | 4/2011 |
| WO | 2006038157 A2 | 4/2006 |
| WO | 2008001262 A1 | 1/2008 |
| WO | 2008152565 A2 | 12/2008 |
| WO | 2009101570 A1 | 8/2009 |
| WO | 2011001369 A2 | 1/2011 |
| WO | 2011055285 A2 | 5/2011 |
| WO | 2012052935 A1 | 4/2012 |
| WO | 2012085759 A2 | 6/2012 |

* cited by examiner

DRIVER DEVICE AND DRIVING METHOD FOR DRIVING A LOAD, IN PARTICULAR AN LED UNIT

CROSS-REFERENCE TO PRIOR APPLICATIONS

This application is the U.S. National Phase application under 35 U.S.C. §371 of International Application No. PCT/IB13/059390, filed on Oct. 16, 2013, which claims the benefit of U.S. Provisional Patent Application No. 61/718,255, filed on Oct. 25, 2012. These applications are hereby incorporated by reference herein.

FIELD OF THE INVENTION

The present invention relates to a driver device and a corresponding driving method for driving a load, in particular an LED unit, comprising one or more LEDs. Further, the present invention relates to a light apparatus.

BACKGROUND OF THE INVENTION

In the field of LED drivers resonant converters like LLC converters are commonly known for driving LEDs. The resonant converter control the output power provided to the load by switching two controllable switches and by providing an alternating drive voltage to an electromagnetic transformer. The energy transferred by the resonant converter is proportional to the energy change in a capacitor between the two switching states of the controllable switches. The energy provided to the load is controlled by switching the controllable switches.

The light emitted from the LED units can also be used for transmitting information such as a light identity number, which is invisible for the user. The so-called coded light can be implemented as a modulated output power of the resonant converter, e.g. the LLC converter. A method for modulating the light emission of a lighting device is e.g. known from WO 2008/001262 A1.

A further possibility to transmit information by means of driver devices for driving LED units is to transmit coded sound similar to the above-mentioned coded light. The coded sound has the advantage that the receiver of the coded sound does not need to be inline of sight to the emitter and, further, if the coded sound is in the ultrasound range, it is not audible for the user.

The power output of the resonant converter is usually controlled by varying the duty cycle of the controllable switches as disclosed by US 2011/0164437 A1. Alternatively, the output power of the resonant converters can be controlled by changing the switching frequency of the switches as e.g. disclosed by U.S. Pat. No. 7,313,004 B1.

A key problem of the transmission of the coded light or the coded sound is that the transmission is perceptible for the user either due to a perceptible flicker of the emitted light or due to the sound when the information packet is transmitted. Usually the perceptible flicker is minimized by using certain coding schemes which have a mean value of zero.

Since highly efficient power converter like resonant converter are highly non-linear regarding their frequency control, it is difficult to modulate the amplitude of an emitted electrical power for powering a load and for providing a respectively coded light or sound.

SUMMARY OF THE INVENTION

It is an object of the present invention to provide a driver device and a corresponding driving method for driving a load, in particular an LED unit comprising one or more LEDs, and for emitting a coded signal for transmitting information which is not perceptible for the user with low technical effort. Further, it is an object of the present invention to provide a corresponding light apparatus.

According to one aspect of the present invention, a driver device is provided for driving a load, in particular an LED unit having one or more LEDs, comprising:
  input terminals for connecting the driver device to a voltage supply and for receiving an input voltage from the voltage supply,
  an output terminal for connecting the driver device to the load,
  a converter unit for converting a drive voltage to an output voltage for powering the load,
  a switching unit connected to the input terminals for providing different voltage levels as the drive voltage to the converter unit, and
  a control unit for controlling the switching unit on the basis of an electrical converter signal measured at a member of the converter unit and a reference signal having an alternating component to provide an output signal having an alternating signal component on the basis of the alternating component of the reference signal.

According to another aspect of the present invention a driving method for driving a load, in particular an LED unit comprising one or more LEDs is provided, wherein the driving method comprises the steps of:
  providing different voltage level as a drive voltage to a converter unit by means of a switching unit,
  converting the drive voltage to an output voltage by means of the converter unit for powering the load, and
  controlling the switching unit on the basis of an electrical converter signal measured at a member of the converter unit and a reference signal having an alternating component to provide an output signal having an alternating signal component on the basis of the alternating component of the reference signal.

According to still another aspect of the present invention, a light apparatus is provided comprising a light assembly comprising one or more LED units, in particular an LED unit comprising one or more LEDs and a driver device for driving said assembly as provided according to the present invention.

Preferred embodiments of the invention are defined in the dependent claims. It shall be understood that the claimed method has similar and/or identical preferred embodiments as the claimed device and as defined in the dependent claims.

The present invention is based on the idea to control the switching unit on the basis of a measured converter voltage or a converter current, which is compared to or combined with a reference signal and wherein the reference signal comprises an alternating component. The switching point of the controllable switches of switching unit is varied depending on the alternating component so that an output signal of the driver device is alternating on the basis of the alternating component. Since the control of the controllable switches is based on the measured converter voltage or current and the reference signal, a modulation signal can be easily implemented by varying the reference signal, wherein the modulation of the resulting output signal is not perceptible for the user since the output signal is slightly varied and has a mean value different from zero. Hence, the output signal can be easily modulated and the transmitted information is not perceptible for the user.

The driver device of the invention may include resonant type converters, however, also non-resonant type converters, such as buck-type or boost type converters, may be applied. In a preferred embodiment, the control unit has a scaling unit for scaling the electrical converter signal on the basis of a reference variable and for providing a scaled signal. The reference variable is preferably a reference voltage potential. This is a simple possibility to reduce the electrical converter signal to a signal level that can be processed by an analogue circuitry like a comparator device.

According to a preferred embodiment, the control unit comprises a comparator device for controlling the controllable switch on the basis of an electrical signal derived from the electrical converter signal and a threshold signal. The controllable switch can be easily and precisely controlled on the basis of the threshold signal to provide an approximately constant output power since the output power can be linearly changed by adjusting the threshold level.

In a preferred embodiment, the reference signal having the alternating component is provided to the comparator device as the threshold signal. This is a simple solution to apply a modulation signal and to achieve an alternating output signal for transmitting information.

In a further embodiment a constant signal is provided to the scaling unit as the reference variable. This is a simple solution to shift the electrical converter signal, which is usually centered to zero, to a positive or negative pulsating signal which can be easily processed by a comparator device.

In a further preferred embodiment, the reference signal is provided to the scaling unit as the reference variable. Hence, the scaling unit is used for scaling the electrical converter signal and for applying the modulation signal such that a combined signal is provided to the comparator device including the alternating converter signal and the modulation signal and a corresponding offset. The such combined scaling signal is compared by means of the comparator unit with a simple reference signal for generating the switching point of the controllable switch.

In a further embodiment, the reference signal comprises a constant signal component as an offset value. This is a simple solution to control the power level of the electrical output power of the driver device and to implement the modulation signal.

In a further embodiment, a pulse width modulated signal filtered by a filter element is provided to the scaling unit as the reference variable. This is a possibility to provide a reference variable, e.g. a reference potential to the scaling unit with low technical effort and, further, this pulse width modulated signal can be used to apply a further modulation signal to the scaling unit.

In a further embodiment, the control unit comprises an analog-to-digital converter for converting an analog signal derived from the electrical converter signal to a digital signal and for providing the digital signal to the comparator device, wherein the comparator device is formed of a digital device. The comparator device is preferably formed by a digital comparator or a software implementation running on a digital computer. In this embodiment, the digital device compares a digital signal to the threshold digitally. This is a solution suitable for implementations of the driver device by digital processor units like field programmable gate arrays (FPGA) or application specific integrated circuits (ASIC) for a precise control of the controllable switches having a reduced size.

In a further embodiment, to reduce the variations in output voltage caused by variation in the input voltage, the input voltage can be sensed by the control unit and used to adjust the control parameters.

In a preferred embodiment, the control unit comprises a sampling unit for sampling a scaled signal and/or the electrical converter signal. This is a possibility to reduce the technical effort to measure the scaled signal and/or the electrical converter signal and to reduce the technical effort for controlling the controllable switches.

In a preferred embodiment, the electrical converter signal is a voltage across a primary winding of the converter unit. This is a possibility to precisely set the output power to a desired level.

In an alternative embodiment, the electrical converter signal is a voltage across a resonant capacitor of the converter unit. This is a possibility to control the electrical output power with low technical effort since the capacitor voltage corresponds to the input current of the converter unit.

In a preferred embodiment, the electrical converter signal is a current through the converter unit. This is a possibility to control the electrical output power precisely, since the converter current is less susceptible to noise.

In a preferred embodiment, the output signal is an electrical output current provided to the load. This is a simple possibility to vary the electrical output power provided to the load and in particular to vary the light emitted from the LED unit for transmitting information by means of coded light.

In a further embodiment, the output signal is a sound signal, in particular an ultrasound signal, emitted from the driver device. This is a further possibility to transmit information by means of the driver device, wherein the receiver of the coded sound information does not need to be inline of sight of the driver device or the load.

In a further embodiment, the control unit is adapted to adjust the reference signal on the basis of the input voltage. This provides a feed forward control to reduce the variation of the output voltage or the output current if the input voltage increases.

As mentioned above, the present invention provides an improved driver device for driving a load and a corresponding method, wherein coded light or coded sound can be transmitted which is not perceptible to the user, since a modulation signal is applied to the driver device by means of a reference variable including an alternating component. This is a possibility to reduce the technical effort for modulating an output signal of the driver device and to reduce the perceptibility since the mean value of the output signal corresponds to a usual constant output power. The driver device can be implemented with low technical effort by means of a scaling unit and a comparator device, wherein the modulation signal can be applied to either the scaling unit or the comparator device. The comparator device provides a signal for switching the controllable switch.

Hence, an alternating output signal can be provided to transmit information with low technical effort.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
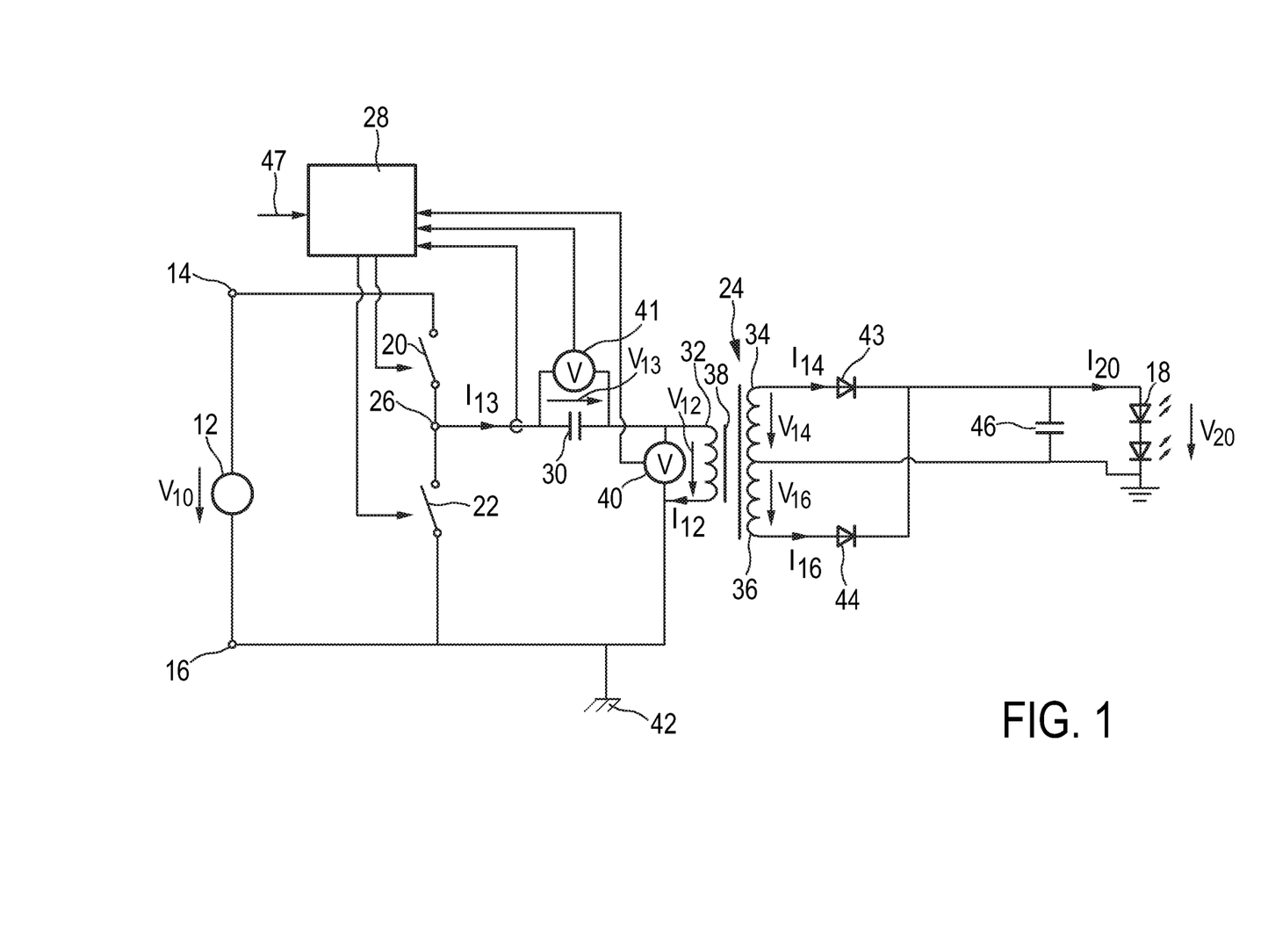
FIG. 1 shows a schematic block diagram of a driver device for driving a load.

FIG. 1 shows a schematic block diagram of a driver device generally denoted by 10. The driver device 10 is connected to a voltage supply 12 which provides a supply voltage V10. The driver device 10 is connected to the voltage supply 12 by means of the input terminals 14, 16. The driver device 10 converts the input voltage V10 to an output voltage V20 and an output current I20 for powering a load 18, which is in the particular embodiment shown in FIG. 1 formed of an LED unit 18. The driver device 10 is preferably an LLC converter.

The driver device 10 comprises two controllable switches 20, 22 and a converter unit 24 for converting the input voltage V10 to the output voltage V20 for powering the load 18. The input voltage V10 is a constant voltage or a rectified voltage rectified by means of a rectifier (not shown) connected to an AC voltage supply. The controllable switches 20, 22 are connected in series to each other and are connected in parallel to the input terminals 14, 16. The controllable switches 20, 22 are connected to each other to form a half bridge, wherein a node 26 between the controllable switches 20, 22 forms an output terminal of the half bridge. The driver device 10 comprises a control unit 28 for controlling the controllable switches 20, 22. The control unit 28 switches the controllable switches 20, 22 alternating to provide different voltage level as a drive voltage to the node 26 and to the converter unit 24 as explained below.

The node 26 of the half bridge is connected to an input capacitor 30 of the converter unit 24. The converter unit 24 is formed of a transformer comprising a primary winding 32, two secondary windings 34, 36 and an electromagnetic coupling member 38 for coupling the primary winding 32 and the second windings 34, 36. The converter unit 24 comprises a measurement device 40 for measuring a primary voltage V12 at the primary winding 32. The converter unit 24 further comprises a measurement device 41 for measuring a capacitor voltage V13 dropping across the input capacitor 30. The measurement devices 40, 41 are used alternatively and are connected to the control unit 28 for providing a measurement signal to the control unit 28 for controlling the controllable switches 20, 22. In an alternative embodiment, a primary current I12 in the primary winding 32 or a capacitor current I13 in the input capacitor 30 is measured for providing a measurement signal to the control unit 28 for controlling the controllable switches 20, 22 as shown in FIG. 1. The primary winding 32 is connected to a primary ground 42. Alternatively, the primary winding 32 may be connected to the node 26 and the input capacitor 30 may be connected to ground 42. Further, an external inductor may be connected to the primary winding 32. The primary voltage V12 and the primary current I12 in the primary winding 32 is transformed to two secondary voltages V14, V16 and two secondary currents I14, I16 provided by the secondary windings 34, 36, respectively. The secondary windings 34, 36 are each connected via a diode 43, 44 and an output capacitor 46 and to the load 18 for providing an output current I20 and the output voltage V20 to the load 18 for powering the load.

The controllable switches 20, 22 are switched alternating to provide a pulsating or alternating voltage as the drive voltage to the converter unit 24. The output voltage V20 and the secondary currents I14, I16 are depending on the wave form of the primary voltage V12 and can be controlled by a switching frequency of the controllable switches 20, 22 and a duty cycle of an on-time of the controllable switches 20, 22. The control unit 28 receives a measurement signal from the measurement device 40 and/or the measurement device 41 and a control signal 47 including a modulation signal to be transmitted by the driver device 10 and controls the controllable switches 20, 22 on the basis of the primary voltage V12 and/or the capacitor voltage V13 and the control signal 47.

Figure 2:
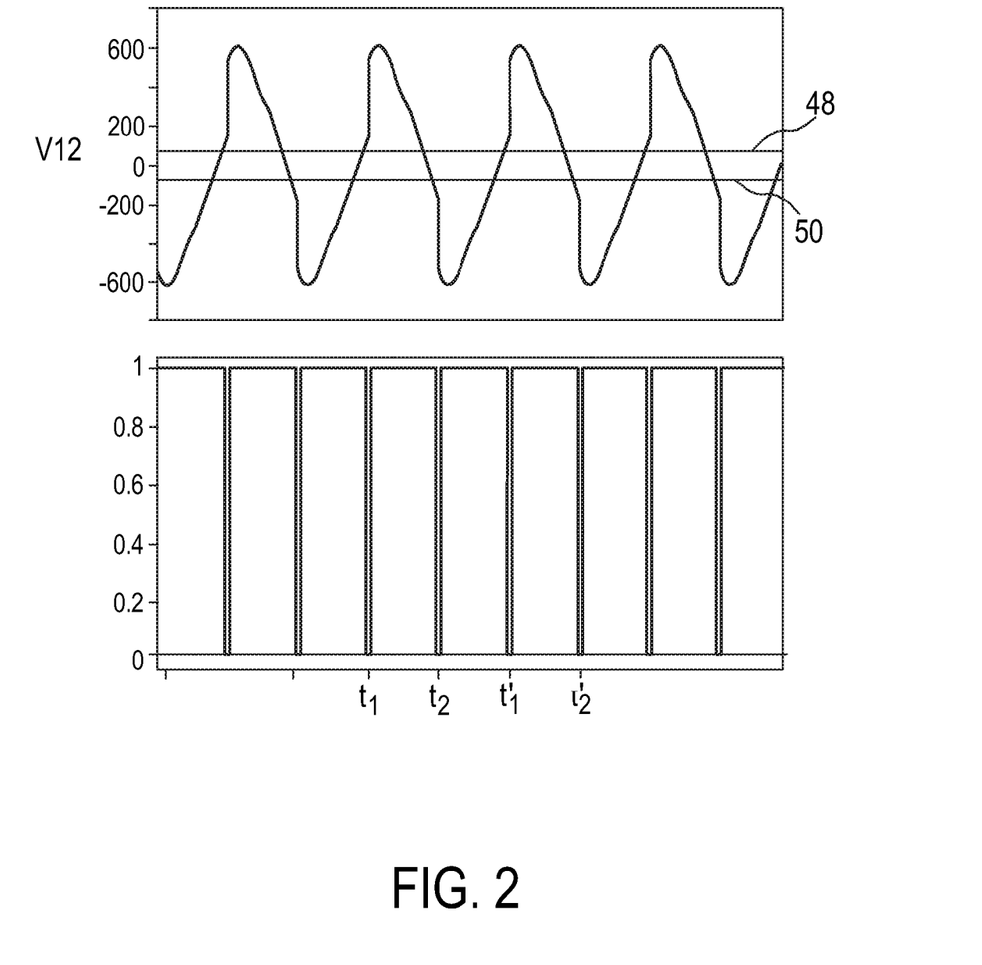
FIG. 2 shows a diagram illustrating a control of the driver device on the basis of two threshold levels.

FIG. 2 shows a diagram illustrating the on-time of the controllable switches 20, 22 and the resulting primary voltage V12. The controllable switches 20, 22 are voltage-controlled and switched on the basis of the primary voltage V12 and an upper threshold level 48 and a lower threshold level 50.

If the primary voltage V12 reaches the upper threshold level 48 at t1, the upper controllable switch 20 is switched on and the lower controllable switch 22 is switched off after a short time period to allow zero voltage switching. This leads to an increase of the primary voltage V12 until a maximum value is reached followed by a decrease of the voltage V12. At t2, the primary voltage V12 drops below the lower threshold 50 and the switching states of the controllable switches 20, 22 reverses, i.e. the upper controllable switch 20 is switched off and the lower controllable switch 22 is switched on, typically after a short time period. This leads to a decrease of the primary voltage V12 until a minimum value is reached followed by an increase of the primary voltage V12. At t1', the primary voltage V12 reaches the upper threshold level 48 again which leads to a reverse of the switching states of the controllable switches 20, 22. This cycle repeats continuously to deliver power to the output load 18. Hence, the switching of the controllable switches 20, 22 can be controlled by means of the threshold values 48, 50 and the electrical energy transferred by the driver device 10 to the load 18 can be controlled by varying the threshold levels 48, 50.

In an alternative embodiment, one of the controllable switches 20, 22 is controlled on the basis of one of the threshold levels 48, 50 wherein the respective other of the controlled switches 20, 22 is time controlled. Hence, the switching of the threshold controlled controllable switches 20, 22 can be varied by varying of the respective threshold level, wherein the on-time of the respective other controllable switch 20, 22 is set to a predefined level or set to a level corresponding to the other controllable switch 20, 22.

If one of the threshold levels 48, 50 comprises an alternating signal component, the switching of the respective controllable switch is slightly varied such that the output power of the driver device 10 is varied and has an alternating output power component. Hence, the threshold levels 48, 50 can be used to modulate the output power provided to the load 18 as described below.

In an alternative embodiment, the controllable switches 20, 22 are controlled on the basis of the capacitor voltage V13 and one or both of the threshold voltages 48, 50. In other words, alternatively to the primary voltage V12, the capacitor voltage V13 can be used for the switch control. A further alternative is using the current I13 in the input capacitor 30 or the primary current I12 in the primary winding 32 as a basis for controlling the controllable switches 20, 22.

Figure 3:
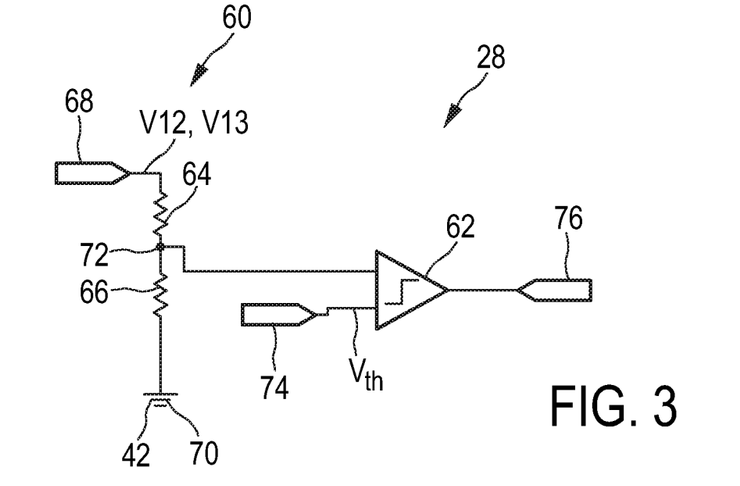
FIG. 3 shows a schematic block diagram of a control unit for controlling the driver device on the basis of a modulated threshold level, FIG. 4a, b show schematic block diagrams of a control unit for controlling the driver device on the basis of an offset voltage and a modulator signal.

FIG. 3 is a schematic block diagram of an element of the embodiment of the control unit 28. The control unit 28 includes a scaling device 60 and a comparator device 62, which are connected to each other. The scaling device 60 is formed as a voltage divider comprising a first resistor 64 and a second resistor 66 connected in series to each other. The scaling device 60 is connected to a measurement unit 68 for measuring a converter voltage, e.g. the primary voltage V12 or the capacitor voltage V13. The scaling device 60 is also connected to a reference potential 70, which is in this case the primary ground level 42. If the scaling device 60 is connected to the primary ground level 42, the scaling device 60 can be connected directly to the capacitor 30 or the primary winding 32 to measure the respective voltage level V12, V13. The scaling device 60 comprises a node 72 between the first resistor 64 and the second resistor 66 for providing a scaled voltage to the comparator device 62. The scaling device 60 scales the primary voltage V12 or the capacitor voltage V13 to a voltage level that can be used by an analogue circuitry such as the comparator device 62.

The comparator device 62 comprises two input terminals, wherein one of the input terminals connected to the node 72 of the scaling device 60 and the second input terminal is connected to a digital-to-analog converter 74. The digital-to-analog converter 74 provides a threshold level Vth comprising a modulation signal and an offset voltage to the comparator device 62. The output terminal of the comparator device 62 is connected to a switch controller 76 for controlling one of the controllable switches 20, 22. A similar arrangement would be used for the respective other controllable switch 20, 22. In some embodiments the scaling device 60 could be used to drive two comparators, one for each of the controllable switches 20, 22.

The comparator device 60 compares the scaled voltage and the threshold level Vth of the digital-to-analog converter 74. If the scaled voltage exceeds the threshold level, an output signal is provided to the switch control 76 and the switch control 76 switches the controllable switch 20, 22 on or off. Since the primary voltage V12 or the capacitor voltage V13 are usually centered to zero, the comparator device 62 operates with positive and negative scaled voltages. Hence, the control unit 28 in this analogue implementation can be used with bi-directional power supplies. The digital-to-analog 74 in this embodiment is used for modulation and to control the mean output power of the driver device 10, since the offset voltage can be set to a certain level to set the respective threshold level Vth and to control the on-time of the controllable switches 20, 22 as described above.

Figure 4A:
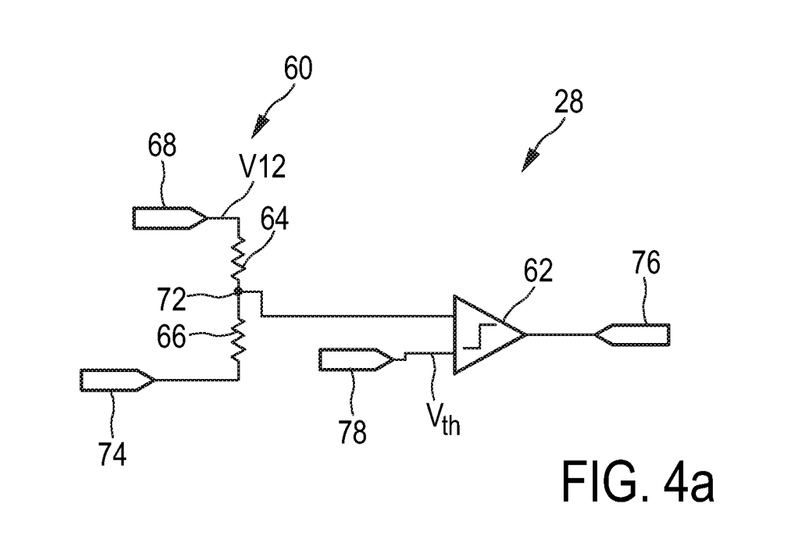

FIG. 4a shows a further embodiment of the control unit 28. Identical elements are denoted by identical reference numerals, wherein here merely the differences are explained in detail. The digital-to-analog converter 74 is in this case connected to the scaling device 60 and provides the reference voltage to the scaling device 60. A modulator 78 is connected to the second input terminal of the comparator device 62 for providing the modulation signal to the comparator device 62. The digital-to-analog converter 74 provides a voltage level to shift the scaling voltage so that the scaled voltage has always positive values even in the case that the primary voltage V12 or the capacitor voltage V13 is negative or centered to zero. Hence, the comparator device 62 can be simplified and can be implemented as digital system. The digital-to-analog converter 74 is adapted in this case to provide a source current and a sink current. The modulation signal provided by the modulation generator 78 in this case needs a fixed offset to provide a suitable threshold level including the modulation signal. The mean power control in this case is provided by the digital-to-analog converter 74 since the reference voltage provided to the scaling device 60 sets the scaled voltage to a respective level with respect to the threshold level. If the digital-to-analog converter 74 is fast and precise enough, the embodiment shown in FIG. 4b can be used.

Figure 4B:
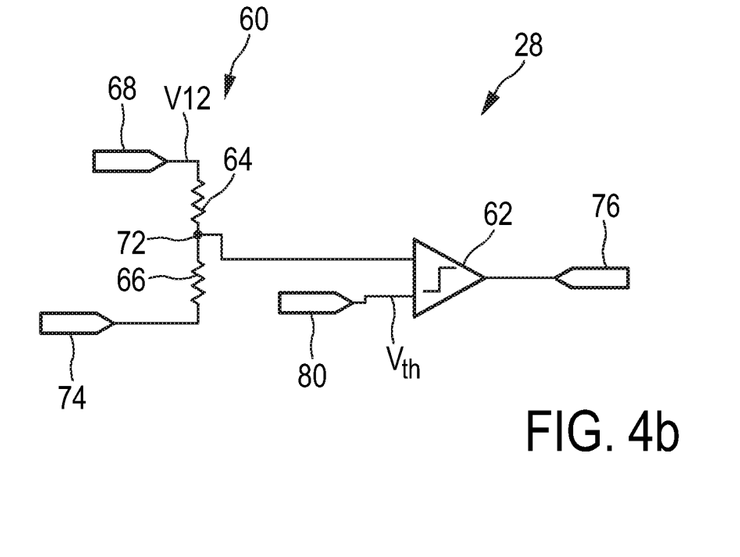

FIG. 4b shows an embodiment of the control unit 28. Identical elements are denoted by identical reference numerals, wherein here merely the differences are explained in detail. The digital-to-analog converter 74 in this case is fast and precise enough to provide the modulation signal and a respective offset voltage to control the mean power of the driver device 10. The second input terminal of the comparator device 62 is connected to a reference generator 80 providing a constant threshold level to the comparator device 62.

Since the digital-to-analog converter 74 provides a reference voltage comprising the modulation signal and an offset voltage to the scaling device 60, the scaled voltage comprises the primary voltage V12 or the capacitor voltage V13, the respective offset and the modulation signal so that the threshold voltage Vth provided by the reference generator 80 is a constant value.

Figure 5:
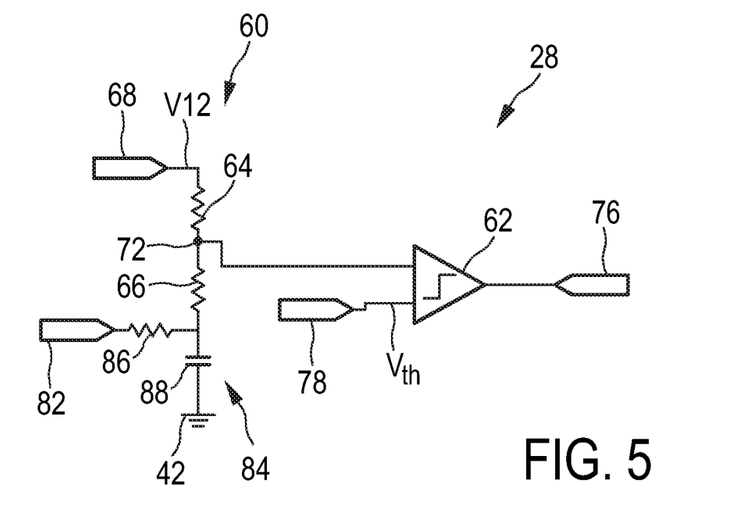
FIG. 5 shows a schematic block diagram of a control unit for controlling the driver device on the basis of a pulse width modulated offset voltage, FIG. 6a, b show schematic block diagrams of a control unit for driving the driver device on the basis of digital modulation.

FIG. 5 shows a further embodiment of the control unit 28. Identical elements are denoted by identical reference numerals, wherein here merely the differences are explained in detail. The scaling device 60 is connected to a PWM-generator 82 and a filter device 84 for generating the reference potential. The PWM-generator 82 provides a pulse width modulated signal to the filter device 84. The filter device 84 filters the pulse width modulated signal to a substantially constant reference voltage provided to the scaling device 60. The filter device 84 is formed of a resistor 86 and a capacitor 88 connected to the primary ground 42. The modulation generator 78 is connected to the comparator 62 for providing the modulation signal including an offset voltage to the comparator device 62. Since the reference voltage provided by the PWM-generator 82 still has an alternating signal component, an aliasing modulation can be provided in combination with the modulation signal provided by the modulation generator 78.

Figure 6A:
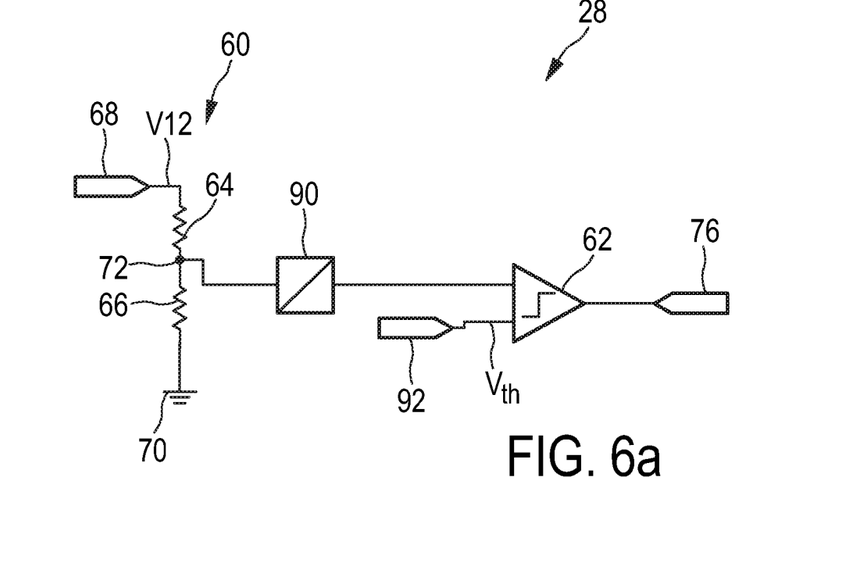
Figure 6B:
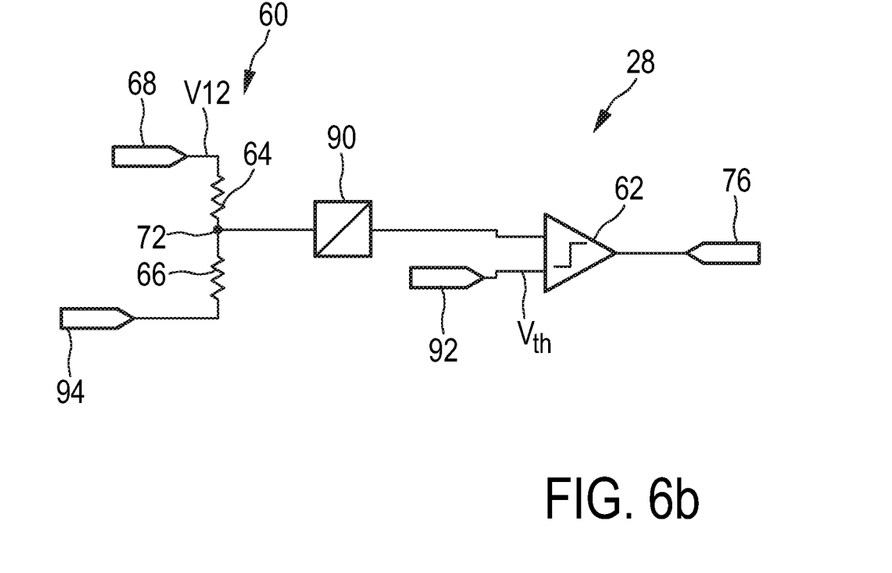

FIG. 6a, b show two embodiments including an analog-to-digital converter. Identical elements are denoted by identical reference numerals, wherein here merely the differences are explained in detail.

The node 72 of the scaling device 60 is connected to an analog-to-digital converter 90 converting the analog scaled voltage to a digital signal. The digital signal is provided to the first input terminal of the comparator device 62, which is in this case a digital comparator 62. The second input terminal of the digital comparator device 62 is connected to a digital reference generator 92 for providing a digital reference including the threshold level 48, 50, the offset and the modulation signal. This implementation would be suitable for field programmable gate arrays (FPGA) or application specific integrated circuits (ASIC) implementations. In the embodiment shown in FIG. 6a, the scaling device 60 is connected to the primary ground 42 such that the analog-to-digital converter 90 should be suitable for positive and negative values of the scaled voltage.

In FIG. 6b an embodiment of the converter unit 28 is shown having a reference generator 94 connected to the scaling unit 60 for providing the reference voltage as an offset to the scaling device 60. By means of the reference generator 94, the scaled voltage is shifted to positive values such that the analog-to-digital converter 90 has to convert only positive voltages.

In a certain embodiment, a feed forward control is provided for adding a small offset to the signal provided by the digital-to-analog converter 74 and/or to the pulse width modulated signal provided by the PWM-generator 82 while the modulation is applied. Further, the control unit 28 comprises a feed forward control unit which measures the input voltage V10 and adjusts at least one of the reference signals Vth on the basis of the measured input voltage V10. The reference signal Vth is adjusted so that the limit for the measured converter signal i.e. the primary voltage V12, the capacitor voltage V13, the primary current I12 or the capacitor current I13 becomes wider if the input voltage V10 decreases and the limit becomes tighter if the input voltage V10 increases. In other words the upper threshold level 48 is increased and/or the lower threshold level 50 is decreased if the input voltage V10 decreases or the upper threshold level 48 is decreased and/or the lower threshold level is increased if the input voltage V10 increases. Hence, the variation in the output voltage V20 or the output current I20 is reduced by the input voltage V10 variation. In a further embodiment, the time-control of the time-controlled controllable switch 20, 22 is adjusted by means of the feed forward control unit on the basis of the input voltage V10.

The modulation methods are described to control the output voltage V20 and/or the electrical output power of the driver device 10 provided to the load 18. The modulation could also be applied to control a sound generated by the driver device 10. This could be either used to shift the sound of the driver device 10 to the ultrasonic range to reduce the perceptibility of the audible noise of the driver device 10 or to modulate the sound output to send information in the ultrasound range such as coded sound.

Figure 7:
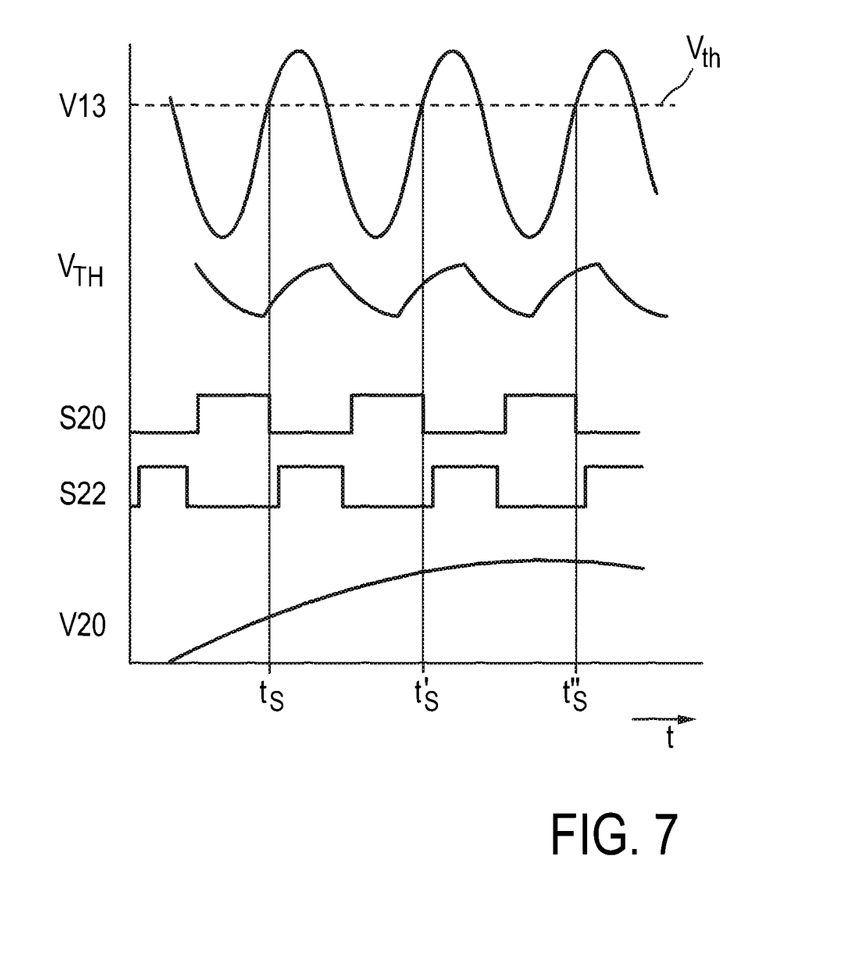
FIG. 7 shows a diagram illustrating the switching of the controllable switches on the basis of a modulated threshold level.

FIG. 7 shows a diagram for explaining aliasing modulation of the output voltage V20. In FIG. 7 the capacitor voltage V13, the threshold voltage Vth in relation to the capacitor voltage V13 and as an enlarged curve, the drive signals S20, S22 of the controllable switches 20, 22 and the output voltage V20 are shown for three cycles of the converter. One of the controllable switches 20, 22 is switched at is as shown in FIG. 7 on the basis of the capacitor voltage V13 and the threshold voltage Vth.

Since the comparator device 62 only triggers a transition when the sensed signal in this case the capacitor voltage V13 crosses the threshold, in effect it samples the threshold voltage at discrete times; causing the output voltage V20 to be aliased. That means that the frequency of the threshold voltage Vth is converted to a lower frequency of the output voltage V20. The threshold voltage Vth is typically generated by a pulse width modulated signal which is filtered to provide the analog threshold voltage Vth as shown in FIG. 5. This results in the ripple of the threshold voltage Vth shown in FIG. 7. The frequency of the threshold voltage Vth of the pulse width modulated signal is aliased or down-converted by the operating frequency of the converter 24 resulting in the lower frequency of the output voltage V20.

Figure 8:
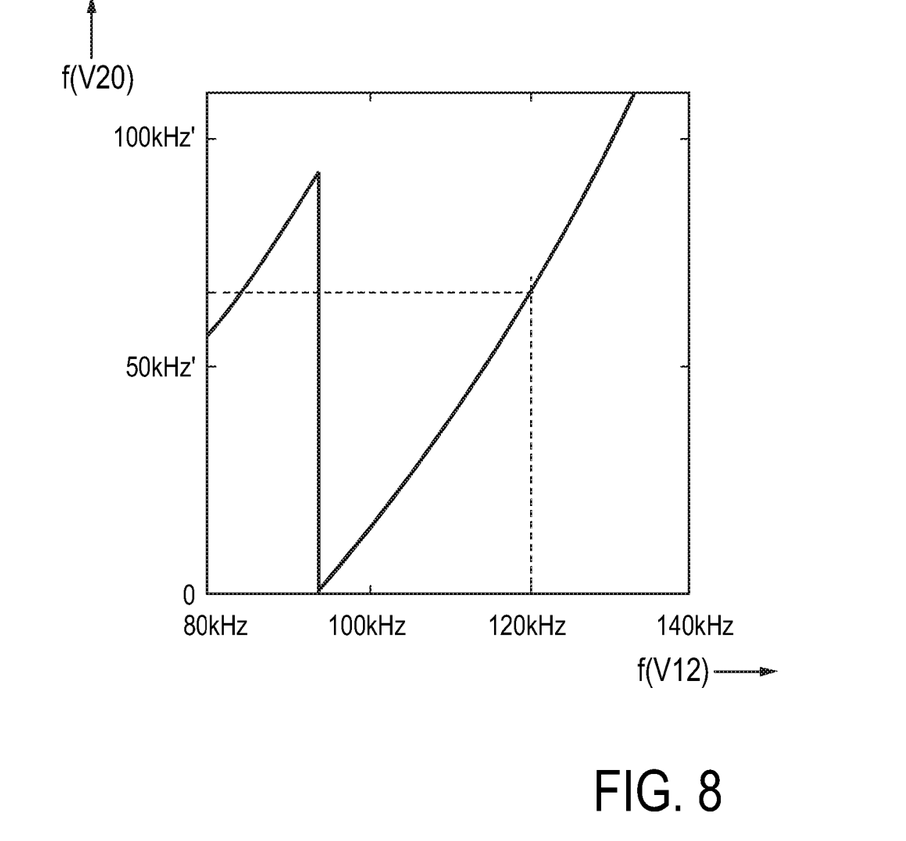
FIG. 8 shows a diagram illustrating the control of the driver device on the basis of an aliasing frequency.

FIG. 8 shows the aliased frequency of the output voltage V20 for a fixed threshold voltage frequency of 93.75 kHz dependent on the frequency of the switching of the controllable switches 20, 22.

As shown in FIG. 8 the switching frequency of the converter unit 24 combined with the frequency of the threshold voltage Vth result in a lower frequency ripple of the output voltage V20. E.g. a frequency of the primary voltage V12 of 120 kHz result in a frequency of the output voltage V20 of approximately 80 kHz.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A device for driving a load including one or more LEDs, the device comprising:
    input terminals configured to connect the device to a voltage supply and for receiving an input voltage from the voltage supply,
    an output terminal configured to connect the device to the load,
    a converter unit for converting a drive voltage to an output voltage for powering the load,
    a switching unit connected to the input terminals for providing different levels of the drive voltage to the converter unit, and
    a control unit for controlling the switching unit based on an electrical converter signal measured at an element of the converter unit and a reference signal,
    wherein the reference signal represents a threshold level, and
    wherein the reference signal is a modulating signal to modulate an output signal of the device.

2. The device of claim 1, wherein the control unit has a scaling unit for scaling the electrical converter signal based on a reference variable and for providing a scaled signal.

3. The device of claim 2, wherein the reference signal is provided to the scaling unit as the reference variable.

4. The device of claim 2, wherein a pulse width modulated signal filtered by a filter element is provided to the scaling unit as the reference variable.

5. The device of claim 1, wherein the control unit comprises a comparator device for controlling the switching unit based of an electrical signal derived from the electrical converter signal and a threshold signal.

6. The device of claim 5, wherein the reference signal having an alternating signal component is provided to the comparator device as the threshold signal.

7. The device of claim 5, wherein the control unit includes an analog-to-digital converter for converting an analog signal derived from the electrical converter signal to a digital signal and for providing the digital signal to the comparator device, wherein the comparator device is a digital device.

8. The device of claim 1, wherein the reference signal comprises a constant signal component as an offset value.

9. The device of claim 1, wherein the electrical converter signal is a voltage across a primary winding of the converter unit.

10. The device of claim 1, wherein the electrical converter signal is a voltage across a resonant capacitor of the converter unit.

11. The device of claim 1, wherein the electrical converter signal is a current through the converter unit.

12. The device of claim 11, wherein the output signal is an ultrasound signal emitted from the driver device.

13. The device of claim 12, wherein the control unit is adapted to adjust the reference signal based on the input voltage.

14. The device of claim 1, wherein the output signal is the output voltage provided to the load.

15. The device of claim 1, wherein the modulating signal comprises data which modulates the output signal, wherein the device transmits the output signal modulated with the data.

16. The device of claim 1, wherein the control unit includes an analog-to-digital converter for generating the reference signal.

17. A method for driving a load which includes one or more LEDs, the method comprising:
- providing different voltage levels as a drive voltage to a converter unit by means of a switching unit,
- converting the drive voltage to an output voltage by means of the converter unit for powering the load, and
- controlling the switching unit based on an electrical converter signal measured at an element of the converter unit and a reference signal having an alternating component to provide an output signal having an alternating signal component based on the alternating component of the reference signal.

18. The method of claim 17, further comprising:
- scaling the electrical converter signal based on a reference variable to produce a scaled signal; and
- controlling the switching unit based on the scaled signal.

19. The method of claim 18, further comprising:
- generating pulse-width-modulated signal;
- filtering the pulse-width modulated signal; and
- providing the filtered pulse-width modulated signal as the reference variable.

20. The method of claim 17, wherein the modulating signal comprises data which modulates the output signal, the method further comprising transmitting the output signal modulated with the data.

* * * * *